United States Patent [19]

Whetstone

[11] 3,903,586
[45] Sept. 9, 1975

[54] METHOD OF MAKING LAMINATED MAGNETIC MATERIAL

[75] Inventor: Clay N. Whetstone, Denver, Colo.

[73] Assignee: Pacific Magnetic Structures, Inc., San Diego, Calif.

[22] Filed: Apr. 12, 1973

[21] Appl. No.: 350,595

Related U.S. Application Data

[62] Division of Ser. No. 79,864, Oct. 12, 1970, Pat. No. 3,756,788.

[52] U.S. Cl. ............... 228/190; 29/603; 29/609; 228/193; 228/234; 228/263
[51] Int. Cl.² .......................................... B23K 31/02
[58] Field of Search .......... 29/472.3, 487, 498, 603, 29/497.5, 609

[56] References Cited
UNITED STATES PATENTS

| | | | |
|---|---|---|---|
| 2,269,523 | 1/1942 | Deutsch | 29/472.3 X |
| 2,753,623 | 7/1956 | Boessenkool et al. | 29/498 X |
| 2,809,422 | 10/1957 | Schultz | 29/498 X |
| 3,269,004 | 8/1966 | Smith, Jr. et al. | 29/498 X |
| 3,271,718 | 9/1966 | Shaw | 29/603 UX |
| 3,350,180 | 10/1967 | Croll | 29/183.5 |
| 3,381,366 | 5/1968 | Winter | 29/472.3 |
| 3,400,450 | 9/1968 | Nock, Jr. et al. | 29/498 X |
| 3,478,415 | 11/1969 | Selman | 29/498 X |
| 3,604,103 | 9/1971 | Borchak | 29/472.3 |
| 3,614,830 | 10/1971 | Bote et al. | 29/609 X |
| 3,682,606 | 8/1972 | Anderson et al. | 29/472.3 X |

FOREIGN PATENTS OR APPLICATIONS

| | | | |
|---|---|---|---|
| 1,034,862 | 1/1963 | United Kingdom | 29/497.5 |

*Primary Examiner*—Ronald J. Shore
*Attorney, Agent, or Firm*—Griffin, Branigan and Butler

[57] ABSTRACT

An extrusion billet is fabricated from layers of soft magnetic material separated by one or more metal layers. The billet is coreduced and heat treated to impart the desired magnetic properties to the soft magnetic material and also to form intermetallic insulating layers between the magnetic layers. Electric field shield sections are formed in a similar manner by placing relatively thick layers of copper between adjacent layers of metal located adjacent the layers of soft magnetic material.

32 Claims, 7 Drawing Figures

METHOD OF MAKING LAMINATED MAGNETIC MATERIAL

This is a division, of application Ser. No. 79,864, filed Oct. 12, 1970 for LAMINATED MAGNETIC MATERIAL AND METHOD OF MAKING SAME now U.S. Pat. No. 3,756,788.

BACKGROUND OF THE INVENTION

This invention relates to laminated magnetic materials and more particularly to a method for making such materials so that the resulting structure has qualities that are particularly suited for use in connection with alternating current applications such as transformer cores, magnetic recording heads, and shields for electric and magnetic fields.

High permeability soft magnetic materials are frequently used for transformer cores, and magnetic heads or the like. In such cases, the high permeability of soft magnetic laminates are held together with electrically insulating organic compounds in order to reduce eddy current losses; and it is an object of this invention to provide both an improved structure of this type and a method for making the improved laminate.

In accordance with present methods of manufacturing high permeability laminates, individual layers of soft magnetic material are first heat treated at around 1,000°C in order to impart the desired qualities of high permeability. The thusly, heat treated soft magnetic layers are then bonded together with organic insulating compounds by a hand process. The heat treating, however, leaves the magnetic layers physically soft so that they have a tendency to bend during the bonding step; and this bending causes both non-uniformity and deterioration of the magnetic qualities of both the individual soft magnetic layers and, the resulting structure.

In addition, in order for the laminated product to have acceptable moderate and high-frequency performance characteristics, the layers of magnetic material are preferably quite thin. That is, on the order of about 0.001 inch. Consequently, the soft magnetic layers are usually derived from thinly rolled stock which has an inherent set or curvature resulting from the rolling operation. When the magnetic layers are laminated, therefore, they are flattened out and in doing additional stresses are created which result in a further deterioration of the uniformity and quality of the structure's magnetic properties. Moreover, the bonding process itself causes certain additional stresses; and frequently laminated cores are "spongy" as a result of a bubble or bonding defect in the organic binder. It is therefore another object of this invention, to provide a laminated magnetic material that is of uniform permeability and coercivity; and substantially free of the above described stresses and defects so as to result in a product having vastly superior and uniform magnetic qualities.

During the above described hand bonding step the soft magnetic layers are frequently so severely bent that the resulting laminate is entirely unsatisfactory for its intended purpose. If such bending is detected during fabrication, the individual laminae can be discarded. This is somewhat costly, but not as serious as when the bent layer is only detected after fabrication in which event it is necessary to discard the entire finished assembly containing the laminated structure. Moreover only a relatively small amount of bending is required before a laminated device must be discarded. This, therefore, results in a very high scrap-loss rate in the industry. Consequently, it is another object of this invention to provide a method of fabricating uniform laminated magnetic materials which eliminates both the hand bonding steps and the high scrap-loss rates.

Because of the above-described difficulties in handling the thin layers of magnetic material, it is not practical to use layers that are thinner than about 0.001 inch. This, however, puts a severe limitation on the frequency ranges with which such structures can perform satisfactorily. Hence, it is another object of this invention to provide a laminated magnetic material having far thinner soft magnetic layers and a method of manufacturing such structures wherein the problems of handling such thin layers are eliminated. An attendant object, of course, is to provide a laminated structure such as a recording head having superior high frequency performance characteristics.

Another object is to provide a laminated magnetic material that can be used as a shield for electrical and magnetic fields.

It is frequently desired that two or more recording heads be "matched". In this regard, a pair of heads might well have high quality performance, but still be unsatisfactory for a given application because of certain differences in their performance characteristics. Because of the uniformity of the structures fabricated in accordance with the principles of this invention it is relatively simple to provide elements that are both matched and admirably suited for high performance applications.

Another advantage of the invention results from the insulating layers having a much greater hardness than the magnetic layers so that the laminate has vastly improved wear characteristics--particularly when used in magnetic head applications.

SUMMARY OF THE INVENTION

In accordance with principles of this invention an extrusion billet is fabricated from layers of soft magnetic material each separated by one or more layers of an insulative compounding material. That is a material which can be reacted with its adjacent layer to form one or more intermetallic electrically insulating compounds. The billet materials are then coreduced to a desired thickness and heat treated to form intermetallic insulating layers and impart the desired magnetic properties to the soft magnetic material.

In accordance with other principles of this invention the articles into which the laminated structure is to be fabricated are shaped, such as by a blanking operation, prior to the heat treating step. In this manner, the heat treating step reduces the stresses developed during the shaping of the laminate into the configuration of its ultimate product.

In accordance with a still further principle of this invention the time and temperature of the heat treatment are selected so that a small amount of the material between the soft magnetic layers is permitted to diffuse into the soft magnetic material itself. In some applications this has been found to increase the resulting structure's frequency characteristics.

Also, where it is desired to form a section to shield or concentrate electric fields one or more layers of highly conductive shielding material such as copper are placed between adjacent magnetic layers. This is particularly useful, for example, in a multi-track tape head embodiment where adjacent head sections are separated from each other by the electric field shielding section. In this manner the magnetic layers shield magnetic fields and the conductive layers shield electric fields to result in an easily fabricated composite structure which shields both magnetic and electric fields and prevents "cross talk" between adjacent head sections. Alternatively laminated shielding sections can be made separately and used in a host of applications for shields as such, and quite aside from their use in combination with recording heads or other transformer-type embodiments.

It will be appreciated from the foregoing summary of the invention that it provides a simple method of forming a high quality laminate without the previously required hand operations which are both costly and decidedly detrimental to the uniformity and overall performance of the resulting product. Moreover, in transformer-type applications the ultimate product's frequency-response characteristics are easily controlled by among other things varying the thickness ratio between the magnetic material and the insulating material; and the amount of coreduction to which the billet is subject.

BRIEF DESCRIPTION OF THE DRAWINGS

The foregoing and other objects, features, and advantages of this invention will be apparent from the more particular description of preferred embodiments thereof as illustrated in the accompanying drawings wherein the same reference numerals refer to the same elements throughout the various views. The drawings are not necessarily intended to be to scale, but rather are presented so as to illustrated the principles of the invention in a clear form.

In the drawings.

DETAILED DESCRIPTION

Figure 1:
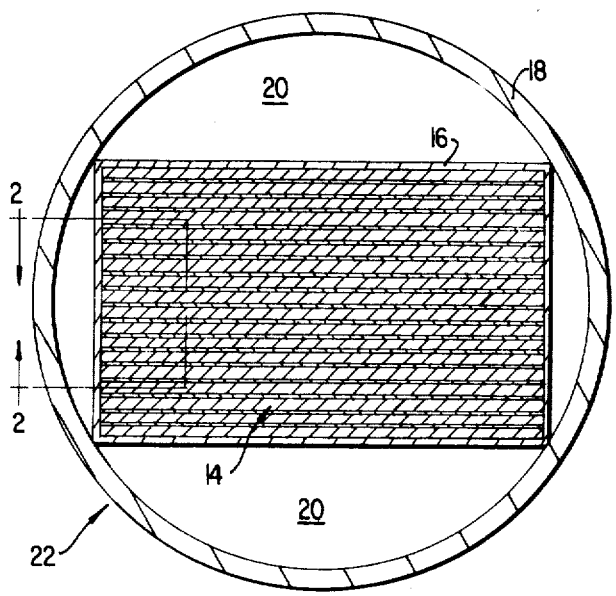
FIG. 1 is a schematic of the cross section of a laminated billet prior to coreduction.
Figure 2:
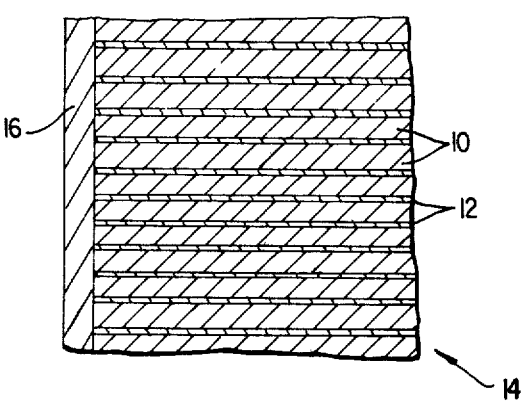
FIG. 2 is an enlarged fragmentary view of FIG. 1 taken along lines 2-2 thereof.

As illustrated in FIG. 2 layers of soft magnetic material 10 are separated by layers 12 of a suitable insulating compounding metal which, when heated reacts with the soft magnetic material to form an electrically insulative compound of elements that are covalently bonded in stoichiometric proportions otherwise referred to as an electrically insulative intermetallic compound. A desired number of these various layers 10 and 12 are made into a sandwich 14 and placed in an etch resistant casing 16 as illustrated in FIG. 1.

The casing 16 and its enclosed sandwich 14 are then placed in an extrusion can 18 and a filler material 20 having mechanical properties similar to that of the magnetic material is placed between the sides of the can 18 and the casing 16. End caps (not shown) are then welded onto the can to close its ends; and, in this regard, one of the caps includes an evacuation tube so that the can can be evacuated after the end caps are welded in place. Once the can is thusly evacuated the tube is "pinched-off" and welded closed to retain a vacuum inside can 18.

The resulting structure 22 of FIG. 1 is then suitably heated and extruded through a laminar-flow die so that the layers 10 and 12 are coreduced and diffusion bonded.

After extrusion the can 18 and filler sections 20 are removed from the billet such as by etching while the etch resistant casing 16 protects the coreduced sandwich 14.

Figure 4:
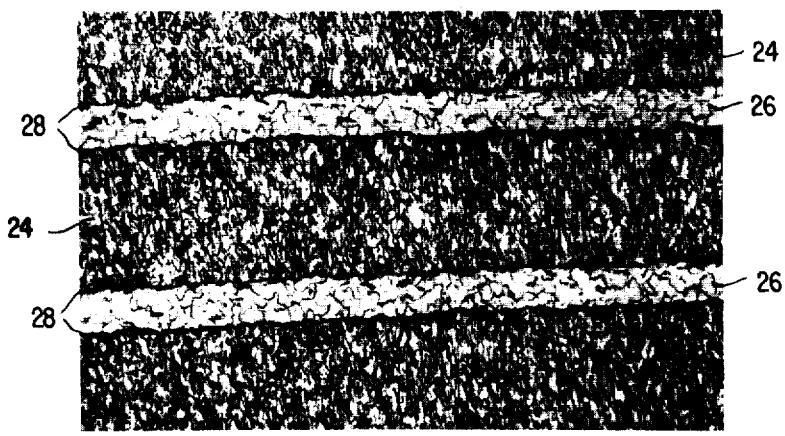
FIG. 4 is a photomicrograph of structure similar to that of FIG. 2 after it has been coreduced.

FIG. 4 is a photomicrograph of the laminated portion of an actually extruded billet to be described in more detail shortly. Briefly, however, FIG. 4 is a 1350× magnification of an extruded laminate comprised of layers of soft magnetic material 24 that have been coreduced with intervening layers 26 of a material with which the magnetic layers 24 will form intermetallic compounds during a heat treating step to be described shortly. It should be noted, however, that the layers 24 and 26 are diffusion bonded as indicated by the dark lines 28.

Preferably, the FIG. 4 laminate is next shaped into its ultimate product form. For example, toroids having square cross sections are machined or blanked out of the extruded flat stock. The shaped pieces are then deburred and etched to remove metal which might be smeared across the edges of the laminations.

Figure 5:
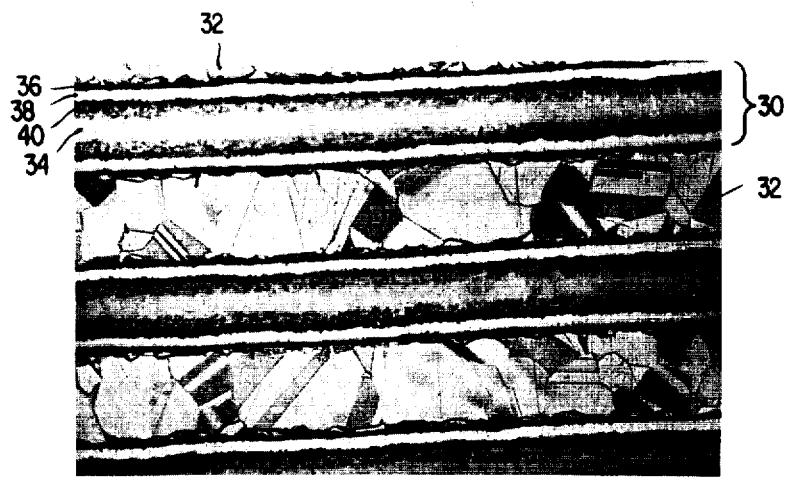
FIG. 5 is a photomicrograph of the FIG. 4 structure after it has been heat treated.

The extruded stock or shaped elements, as the case may be, are next heat treated in a generally conventional manner to anneal the magnetic material and impart to it the desired high permeability and low coercive force qualities. Heat treatment of magnetic material to improve its qualities is already discussed in the literature. Hence, it will not be discussed in detail herein. It should be carefully noted, however, that during the heat treating step in this invention the diffusion couple illustrated by the lines 28 in FIG. 4 gives rise to the formation of intermetallic compounds such as those within bracket 30 in FIG. 5. In this regard, the magnetic material 24 in FIG. 4 is annealed to form the large grained bands 32 in FIG. 5; and the layers 26 in FIG. 4 are located in the center 34 of the bracketed layers 30 in FIG. 5. The remaining layers such as 36, 38 and 40 in FIG. 5 are first, second and third intermetallic compounds of the soft magnetic material and the insulating compounding material.

It is an important aspect of the invention that the layers between the magnetic materials form insulative intermetallic compounds. In this connection it is preferred that the laminations 12 in FIG. 2 be comprised of a refractory metal such as niobium, tantalum, zirconium, titanium, hafnium, or vanadium. The selection of such laminae in any given instance, however, depends upon the type of magnetic material used; and whether the sandwich 14 includes additional layers as will be described shortly in connection with the FIG. 3 embodiment. That is, depending upon the other materials in the sandwich, the layers 10 and 12 are selected to provide at least one layer of an insulative intermetallic compound during the heat treating step.

The above described refractory metals are preferred because of their high melting point and good formability but primarily because they form many insulative intermetallic compounds both between themselves and with iron and nickel in the adjacent layers of soft magnetic material. Other metals such as magnesium, aluminum, zinc, and cadmium are also suitable because they too form insulative intermetallic compounds, albeit fewer in number. Certain rare earths are also suitable. In this regard, phase diagrams showing intermetallic compounds within binary systems are shown in *Constitution of Binary Alloys* by Max Hansen, 2nd Edition, published by McGraw-Hill Book Co., N.Y., 1958; and, *Constitution of Binary Alloys*, First supplement; by Rodney P. Elliot, McGraw-Hill Book Co., N.Y., 1965. Of course intermetallic compounds are also formed in ternary and quaternary alloys. But such formations are complex and will not be discussed further except to note that binary phase diagrams provide strong guidelines as to what can be expected from the more complex alloys; and refer to a discussion of intermetallic compounds and their properties in *Intermetallic Compounds*, J. H. Westbrook, Wiley & Sons, N.Y.

Figure 3:
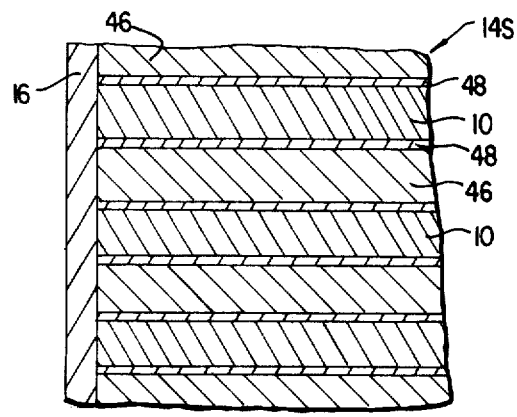
FIG. 3 is a schematic of an alternate embodiment of the structure illustrated in FIG. 2.

The FIG. 3 embodiment is otherwise similar to that described above except that additional layers 44 are placed between the layers of a refractory metal 12 and the layers of magnetic material 10. In this regard, the material for the layers 44 is selected so as to form an intermetallic compound with the material of layer 12, but not harm the conventional magnetic qualities of the material 10. Again, although specific metals will be noted shortly, the above noted properties of many suitable metals and alloys are available in the literature and will not be discussed in detail herein.

In one specific embodiment of the invention the soft magnetic material 10 was comprised of "HY MU 800," a trademarked product of the Carpenter Steel Corporation containing 79% nickel, 16% iron, and 4% molybdenum. This alloy is a single phase, or solid solution alloy, with the crystal structure of nickel; and, when properly heat treated, exhibits high permeabilities and low coercive forces. Each layer 10 was 0.007 in. thick, about 2 inches wide, and about 5 inches long.

The particular embodiments's layers 12 were of commercial grade zirconium about 0.0007 in. thick. In this regard, the relative thicknesses of the layers 10 and 12 are selected to obtain a high quantity of magnetic material while still having enough of the compounding metal to obtain good electrical insulating characteristics over the desired frequency range of operation for the ultimate product. Thickness ratios of 10 to 1 thru 20 to 1 are preferred. The ratio can go to 50 to 1, but fabrication becomes more costly because of the extensive coreduction required. Ratios of as little as 3 to 1 also provide better gain than currently available products, but the gain at these relatively low ratios is considerably less than the gain of structures having thickness ratios within the preferred range. Moreover, when low thickness ratios are used, the annealed product tends to include a relatively thick layer of insulating compounding material corresponding to layer 34 in FIG. 5. Where space is a consideration, however, it is preferable that all or most of the insulating compound metal be reacted to form insulating intermetallic compounds; in which event there is little or no layer corresponding to layer 34 in FIG. 5.

The above described Hy Mu 800/zirconium sandwich 14 was surrounded by a layer of titanium which served as the etch resistant barrier 16. The sandwich and barrier were then placed in a low carbon steel can 18 and a low carbon steel filler metal 20 was employed because of the similarity between its metalurgical characteristics and those of the Hy Mu 800. Another example of a suitable filler metal would be copper-nickel alloy because it too has metalurgical characteristics similar to those Hy Mu 800. Of course, other types of filler metals might be used where other types of magnetic metals are employed; and in this respect it should be noted that any soft magnetic material may be used. Other examples of suitable soft magnetic materials can be found in *Ferromagnetism* by Richard M. Bozorth, published by Van Nostrand, New York, 1951; and *Metals Handbook* by Metals Handbook Committee of ASM, published by ASM, 1961, pages 785–797.

After the assembly 22 was evacuated it was heated to 700°C and extruded through a ½ inch laminar flow die where the layers were coreduced and diffusion bonded. The extruded billet was then sprayed with a ferric chloride etching solution to remove the low carbon steel can and filler sections. In this regard the titanium was selected because it is not attacked by the ferric chloride so that both the titanium and the sandwich were left intact. Hence, the result of the etching step was a rectangular array having the cross section of that depicted in the FIG. 4 photomicrograph.

Toroids having a square cross section were then machined out of the extruded flat stock; and the toroids were deburred and etched in a hydroflouric acid-nitric acid solution to remove metal that had smeared across the edges of the lamination.

Next some of the toroids were heat treated at 900°C for two hours and permitted to cool while they remained in the heating furnace. This resulted in the magnetic layers 32 being in their fully annealed state as indicated by the large grain size and the "thermal twins" (widebands in the grains) in FIG. 5. Although not fully illustrated in the 1,350× FIG. 5 photomicrograph the interdifussion between the layers of zirconium and Hy Mu 800 resulted in the formation of substantially all of the possible intermetallic compounds that might be predicted from the Ni-Zr phase diagram. The layer 40 in FIG. 5 however, is probably the first electrically insulative intermetallic compound of zirconium and Hy Mu 800 and, therefore, highly resistive compared to the Hy Mu 800.

As noted, some of the toroids that were machined from the extruded flat stock were witheld from heat treatment. Both these and the annealed toroids were then wound into a transformer configuration and compared with a similar structure made in accordance with conventional techniques. In this regard, a known alternating current was applied at given frequencies to the primary of each transformer; and the voltage outputs from the secondaries of the transformers were measured by a high impedance volt meter (10 megohms). Particularly at high frequencies to be discussed shortly, the EMF across the secondary of the transformer having the annealed toroids of the invention was much higher for the same drive current than the EMF developed across the unannealed toroids. In addition, the transformers having the annealed toroids of the invention exhibited sharp resonant frequencies resulting from the increased capacitive effect of the intermetallic insulative layers which were thus proven to have been obtained during the heat treatment.

More significantly, the transformers comprised of the invention's annealed structure were several orders of magnitude better than the conventionally structured transformers. That is, the structure of the invention had a better response at a frequency of 10 megacycles than the conventional transformer type core exhibited at 60 cycles. Moreover, the structure of the invention had an excellent constancy of response while the conventionally structured transformer's was down by a factor of five when its input frequency reached only 10 kilocycles.

In two other more particular embodiments of the invention the sandwich 14 was structured in accordance with FIG. 3. In one, 0.007 inch thick layers 10 of Hy Mu 800 were separated by a composite layer comprised of a 0.0007 inch thick layer of titanium (12 in FIG. 3) between adjacent layers 44 of oxygen free high conductivity copper (OFHC) having about the same thickness as the titanium. Copper was selected because it was not known to have any harmful effects upon the magnetic properties of the Hy Mu 800 when diffused into it; and it was also known that copper would form an intermetallic insulative compound with titanium. In the other embodiment cadmium was substituted for the titanium layer 12. The remainder of the method of fabrication was the same as that described above; and the test results were equally satisfactory. Hence, it is not necessary that the intermetallic compound be formed with the magnetic material itself. Moreover, it has been found that the resulting structure's frequency response improves when there is diffusion of an intermediate metal such as copper into the magnetic metal. After a point, of course, extensive such diffusion would indeed harm the magnetic qualities of the magnetic material itself, but up to that point it has been found helpful to encourage such diffusion. In the Hy Mu 800/copper/titanium embodiment, for example, it was found that up to 6% of the copper could be satisfactorily diffused into the Hy Mu 800.

Preferably the intermediate layer of copper 44 in FIG. 3 should not be much, if any, thicker than the layer of insulative compounding material. In fact, for transformer-type applications it is preferred that the intermediate layer of highly conductive metal be sufficiently thin that it is substantially completely reacted during the annealing step to form intermetallic compounds in place of the original intermediate layer. This is not to say that the resulting transformer-type embodiments can not retain an unreacted layer of the intermediate metal, but eddy current losses increase as the thickness of such a layer increases; and the advantages of the intermediate layer are dissipated as its thickness approaches that of the soft magnetic material. Still other embodiments were substantially the same as those just described except that the copper was replaced by nickel and the results were about the same.

Figure 6:
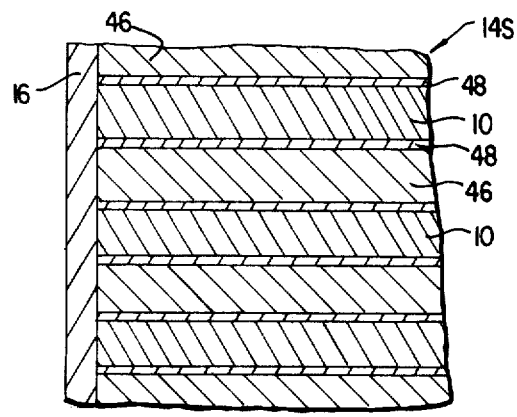
FIG. 6 is a schematic cross-sectional view of a shielding laminate fabricated in accordance with principles of the invention.

Yet another embodiment of the invention is schematically illustrated in connection with the shield structure of FIG. 6. Therein a shield sandwich 14S is comprised of layers of copper 46 that were relatively thick as compared with intermediate layers 44 in the FIG. 3 embodiment. These layers 46 were placed between adjacent layers 48 of titanium and soft magnetic material 10. In this regard, both the copper and magnetic material layers were 0.007 inches thick and the titanium was 0.0007 inches thick. The embodiment was otherwise fabricated in the same manner described above. In this case, however, the titanium layers 48 formed insulative intermetallic compounds with both the soft magnetic material 10 and the thick copper layers 46. These intermetallic compounds were similar to layers 36, 38, and 40 in FIG. 5; and the resulting copper layers were sufficiently thick to act as an electric field shield. Hence after the billet was coreduced and blanked the copper layers 46 served an electrical field shields and the magnetic layers 10 (corresponding to layers 32 in FIG. 5) served as magnetic field sheilds.

Inasmuch as the highly conductive layer 46 is used as an electrical field shield it must not be so thin that it is all reacted during the annealing step. In fact it should be at least three times as thick as the layers 48 of insulative compounding material; and it is preferred that the layers 46 be sufficiently thick that there be about the same thickness remaining after the intermetallic compound reaction as there is remaining in the layers of soft magnetic material. But insofar as shield performance is concerned, and commensurate with space limitations, the highly conductive layer can be much thicker if desired. In some shielding applications it is not necessary to insulate the conductive layers 46 from the soft magnetic layers 10. Hence, in those cases layer 48 may be omitted.

Figure 7:
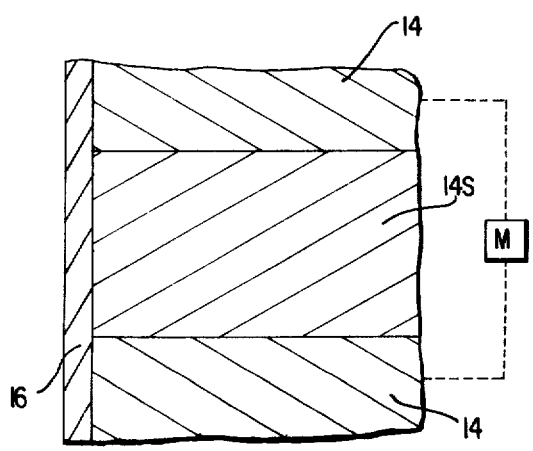
FIG. 7 is a schematic cross sectional view of a composite structure comprised of both a FIG. 2 or 3-type laminate and a FIG. 6-type laminate.

One application of the above described shielding embodiment is to simultaneously form such a structure in combination with the transformer-type structure of FIGS. 2 and 3. That is, as illustrated in FIG. 7 the extrusion billet is comprised of a first sandwich of layers 14 such as those illustrated in FIG. 2 and a second sandwich 14S of shielding layers such as those illustrated in FIG. 6. After coreduction and shaping the transformer-type sections resulting from sandwiches 14 are connected into a driven or receiving magnetic circuit M, but the shielding sections resulting from sandwich 14S are not. In this manner the shielding sections shield the transformer-type sections from each other so that the composite structure of FIG. 7 is admirably suited for use in multi-track recording heads wherein each of the transformer-type sections serves its own track and its adjacent shield section prevents it from receiving "cross talk" from the other transformer-type sections. In the above regard, it should be appreciated by those skilled in the art that the circuit M is intended to be broadly illustrative. For example, the dotted lines do not indicate that the sections 14 are connected together and the circuit $m$ can certainly include electric circuit portions.

In view of the above comments it will be apparent that the method of the invention is far more satisfactory than conventional techniques; and, because hand layering is not required the scrap-loss rate is relatively negligible. Of course, the increase in frequency response in structures made in accordance with the invention is dramatic. Moreover, because of the uniformity between the various elements fabricated from a given piece of extruded flat stock, all of the elements fabricated from the piece are "matched." Hence, the expense and difficulty of obtaining matched elements has been eliminated. Also, because the intermetallic compounds are quite hard the resulting laminate is highly resistant to wear which is a significant advantage— particularly in magnetic recording head applications.

While the invention has been particularly shown and described with reference to preferred embodiments thereof, it will be understood by those skilled in the art that various changes in form and detail may be made therein without departing from the spirit and scope of the invention. For example, layers of additional materials can be used between the layers of soft magnetic material; and although the initial diffusion bonding step has been described in connection with an extrusion die, similar bonding can be obtained by rolling or pressing. In addition the insulative compound materials can include gaseous elements; and they can be electroplated, vapor deposited, or otherwise placed on the soft magnetic material instead of being placed in the sandwich by hand. Also, other techniques can be used to separate the coreduced layers from the extrusion can; and additional layers can be added to the billet sandwich. Similarly, although dimensions of the sandwich elements have been specified above they are not as significant as their ratios. The final thicknesses of the various layers are more important and these can be controlled by the amount of coreduction to give magnetic layers as thin as 0.0001 inches.

I claim:

1. A method of making a laminated material comprising the steps of:
constructing a laminate comprised of layers of magnetically soft metal separated by at least one layer of an insulating compounding material of a type which, when annealed, will form at least one layer of an electrically insulating intermetallic compound located between said layer of electrically insulating compounding material and said layer of magnetically soft metal; and,
subjecting said laminate to heat and pressure so that said layers of magnetically soft metal and said layer of insulating compounding material are diffusion bonded.

2. The method of claim 1 including the step of:
heat treating the diffusion bonded laminate to anneal the magnetically soft metal and create said layer of intermetallic electrically insulating compound located between adjacent magnetically soft layers.

3. The method of claim 1 including the step of forming the diffusion bonded structure into desired shapes.

4. The method of claim 3 including the step of heat treating the thusly formed shapes to anneal said magnetically soft metal and create said layer of intermetallic electrically insulating compound located between adjacent magnetically soft layers.

5. The method of claim 1 including the step of adding a layer of intermediate metal between said layer of magnetically soft metal and said layer of insulating compounding material before said diffusion bonding step and wherein said magnetically soft metal and said layer of insulating compounding material are diffusion bonded to said intermediate metal during said diffusion bonding step.

6. The method of claim 5 including the step of heat treating the diffusion bonded layers to anneal the magnetically soft metal and create said layer of intermetallic electrically insulating compound between said intermediate layer and said layer of insulating compounding material.

7. The method of claim 5 including the step of forming the diffusion bonded structure into desired shapes.

8. The method of claim 7 including the step of heat treating the thusly formed shapes to anneal said magnetically soft metal and create said layer of intermetallic electrically insulating compound between said intermediate metal and said layer of insulating compounding material.

9. The method of claim 1 including the step of:
adding a layer of highly conductive intermediate metal contiguous to said layer of insulating compounding material prior to said diffusion bonding step so that said layer of insulating compounding material is located between a layer of said magnetically soft metal and said layer of highly conductive intermediate metal.

10. The method of claim 9 including the step of:
heat treating the diffusion bonded layers to anneal the magnetically soft metal and create at least one layer of intermetallic electrically insulating compound located between said layer of insulating compounding material and said layer of highly conductive intermediate metal.

11. The method of claim 9 including the step of forming the diffusion bonded structure into desired shapes.

12. The method of claim 11 including the step of heat treating the thusly formed shapes to anneal said magnetically soft metal and create said layer of intermetallic electrically insulating compound between said layer of intermediate metal and said layer of insulating compounding material.

13. The method of claim 1 including the step of forming said laminate into a reduction billet and wherein said diffusion bonding occurs during reduction of said billet so that said layers are diffusion bonded as they are coreduced.

14. The method of claim 13 including the step of:
heat treating the coreduced layers to anneal the magnetically soft metal and create said layer of intermetallic electrically insulating compound located between adjacent soft magnetic layers.

15. The method of claim 13 including the step of forming the coreduced and diffusion bonded structure into desired shapes.

16. The method of claim 15 including the step of heat treating the thusly formed shapes to anneal said magnetically soft metal and create said layer of intermetallic electrically insulating compound located between adjacent soft magnetic layers.

17. The method of claim 13 including the step of adding a layer of intermediate metal between said layer of magnetically soft metal and said layer of insulating compounding material before said coreduction and diffusion bonding step and wherein said layer of magnetically soft metal and said layer of insulating compounding material are diffusion bonded to said layer of intermediate metal during said coreduction and diffusion bonding step.

18. The method of claim 17 including the step of heat treating the coreduced and diffusion bonded layers to anneal the magnetically soft metal and create said layer of intermetallic electrically insulating compound between said intermediate layer and said layer of insulating compounding material.

19. The method of claim 11 including the step of forming the coreduced and diffusion bonded structure into desired shapes.

20. The method of claim 19 including the step of heat treating the thusly formed shapes to anneal said magnetically soft metal and create said layer of intermetallic electrically insulating compound between said layer of intermediate metal and said layer of insulating compounding material.

21. The method of claim 13 including the step of:
adding a layer of highly conductive intermediate metal contiguous to said layer of insulating compounding material prior to said coreduction and diffusion bonding step so that said layer of insulating compounding material is located between a layer of said magnetically soft metal and said layer of highly conductive intermediate metal.

22. The method of claim 21 including the step of:
heat treating the coreduced layers to anneal the magnetically soft metal and create at least one layer of intermetallic electrically insulating compound located between said layer of insulating compounding material of said layer of highly conductive intermediate metal.

23. The method of claim 21 including the step of forming the diffusion bonded structure into desired shapes.

24. The method of claim 23 including the step of heat treating the thusly formed shapes to anneal said magnetically soft metal and create said layer of intermetallic electrically insulating compound between said layer of intermediate metal and said layer of insulating compounding material.

25. A method of making a laminated material comprising the steps of:
constructing a laminate comprised of layers of magnetically soft metal separated by at least one layer of an inorganic material of a type which, when heated, will both:
 i. bond to said magnetically soft metal; and
 ii. result in a continuous inorganic layer whose electrical resistivity is greater than said magnetically soft metal; and
heating said laminate to result in a structure comprised of layers of substantially stress-free magnetically soft metal separated by and bonded to said layer of inorganic material whose electrical resistivity is greater than that of the magnetically soft metal.

26. The method of claim 25 wherein said heating step includes heating to at least the annealing temperature of said magnetically soft metal.

27. The method of claim 25 wherein said laminate is subjected to pressure during said heating step.

28. The method of claim 27 wherein said heating step includes heating to at least the annealing temperature of said magnetically soft metal.

29. The method of claim 27 wherein said application of heat and pressure causes said one layer of inorganic material to react with said magnetically soft material to form an electrically insulating intermetallic compound adjacent said magnetically soft metal.

30. The method of claim 25 wherein said one layer of inorganic material forms a diffusion bond with said magnetically soft metal.

31. The method of claim 25 including the step of adding a layer of intermediate metal between said layer of magnetically soft metal and said layer of inorganic material and wherein said magnetically soft metal and said layer of inorganic material are bonded to said intermediate metal during said bonding step.

32. The method of claim 25 including the step of:
adding a layer of highly conductive intermediate metal contiguous to said layer of inorganic material prior to said bonding step so that said layer of inorganic material is located between a layer of said magnetically soft metal and said highly conductive intermediate metal.

* * * * *